US011786096B2

(12) United States Patent
Buehler

(10) Patent No.: US 11,786,096 B2
(45) Date of Patent: Oct. 17, 2023

(54) AUTONOMOUS SURFACE CLEANING DEVICE WITH MULTIPLE CONTROLLERS

(71) Applicant: BISSELL Inc., Grand Rapids, MI (US)

(72) Inventor: Eric Daniel Buehler, Grand Rapids, MI (US)

(73) Assignee: BISSELL Inc., Grand Rapids, MI (US)

( * ) Notice: Subject to any disclaimer, the term of this patent is extended or adjusted under 35 U.S.C. 154(b) by 356 days.

(21) Appl. No.: 16/759,150

(22) PCT Filed: Oct. 19, 2018

(86) PCT No.: PCT/US2018/056689
§ 371 (c)(1),
(2) Date: Apr. 24, 2020

(87) PCT Pub. No.: WO2019/083836
PCT Pub. Date: May 2, 2019

(65) Prior Publication Data
US 2020/0345190 A1 Nov. 5, 2020

Related U.S. Application Data

(60) Provisional application No. 62/576,908, filed on Oct. 25, 2017.

(51) Int. Cl.
*A47L 9/28* (2006.01)
*A47L 11/40* (2006.01)
*B25J 11/00* (2006.01)

(52) U.S. Cl.
CPC ......... *A47L 9/2852* (2013.01); *A47L 11/4011* (2013.01); *A47L 9/2826* (2013.01);
(Continued)

(58) Field of Classification Search
CPC .............. A47L 11/4011; A47L 11/4083; A47L 11/4088; A47L 2201/022; A47L 2201/04;
(Continued)

(56) References Cited

U.S. PATENT DOCUMENTS 6,605,156 B1 * 8/2003 Clark ........................ A47L 5/30
134/21
7,320,149 B1 * 1/2008 Huffman ............. A47L 11/4011
15/403
(Continued)

FOREIGN PATENT DOCUMENTS

DE 102014105460 A1 10/2015
EP 2672287 A1 12/2013
(Continued)

OTHER PUBLICATIONS

European Patent Office, Extended European Search Report re Corresponding Application No. 18871208.7-1016 / 3700403, dated Jul. 9, 2021, 8 pages, Munich, Germany.
(Continued)

*Primary Examiner* — Marc Carlson
(74) *Attorney, Agent, or Firm* — Quinn IP Law

(57) ABSTRACT

An autonomous surface cleaning device can include a base adapted for movement over a surface to be cleaned, a drive system configured to move the base over the surface to be cleaned, and a vacuum collection system for removing at least debris from the surface to be cleaned. A main controller and a compliance control module can be operably coupled with at least one of the drive system or the vacuum collection system.

13 Claims, 6 Drawing Sheets

(52) U.S. Cl.
CPC ...... *A47L 11/4088* (2013.01); *A47L 2201/022* (2013.01); *A47L 2201/04* (2013.01); *B25J 11/0085* (2013.01); *G05D 2201/0215* (2013.01)

(58) Field of Classification Search
CPC .... A47L 9/2805; A47L 9/2826; A47L 9/2847; A47L 9/2852; A47L 9/2884; A47L 9/2894; B25J 11/0085; G05D 2201/0215
See application file for complete search history.

(56) References Cited

U.S. PATENT DOCUMENTS

| | | | | |
|---|---|---|---|---|
| 9,687,131 | B2* | 6/2017 | Eidmohammadi | A47L 11/4066 |
| 2002/0174506 | A1* | 11/2002 | Wallach | G05D 1/0291 |
| | | | | 15/319 |
| 2008/0155768 | A1* | 7/2008 | Ziegler | B60B 33/0021 |
| | | | | 15/4 |
| 2015/0112538 | A1* | 4/2015 | Jeong | A47L 11/4061 |
| | | | | 701/28 |
| 2015/0128996 | A1* | 5/2015 | Dooley | A47L 11/125 |
| | | | | 15/98 |
| 2015/0265125 | A1* | 9/2015 | Lee | A47L 11/4066 |
| | | | | 701/26 |
| 2020/0345190 | A1* | 11/2020 | Buehler | A47L 9/2847 |

FOREIGN PATENT DOCUMENTS

| | | |
|---|---|---|
| JP | 2014147846 A | 8/2014 |
| KR | 1020120122700 A | 11/2012 |
| KR | 101470364 B1 | 12/2014 |
| KR | 1020150109598 A | 10/2015 |
| WO | 2005083541 A1 | 9/2005 |

OTHER PUBLICATIONS

International Search Report corresponding to PCTUS2018/056689 dated Feb. 18, 2019.

* cited by examiner

US 11,786,096 B2

AUTONOMOUS SURFACE CLEANING DEVICE WITH MULTIPLE CONTROLLERS

CROSS-REFERENCE TO RELATED APPLICATION

This application is a National Phase application of International Application No. PCT/US2018/056689, filed Oct. 19, 2018, which claims the benefit of U.S. Provisional Patent Application No. 62/576,908, filed Oct. 25, 2017, all of which are incorporated herein by reference in their entirety.

BACKGROUND

Autonomous or robotic floor cleaners can move without the assistance of a user or operator in order to clean a floor surface. For example, the floor cleaner can be configured to sweep dirt (including dust, hair, and other debris) into a collection bin carried on the floor cleaner and/or to sweep dirt using a cloth which collects the dirt. The floor cleaner can move randomly about a surface while cleaning the floor surface or use a mapping/navigation system for guided navigation about the surface. Some floor cleaners are further configured to apply and extract liquid for deep cleaning carpets, rugs, and other floor surfaces.

BRIEF SUMMARY

In one aspect, the disclosure relates to an autonomous surface cleaning device including a base adapted for movement over a surface to be cleaned, a drive system associated with the base and configured to move the base over the surface to be cleaned, a vacuum collection system for removing at least debris from the surface to be cleaned, a main controller operably coupled with at least one of the drive system or the vacuum collection system, a compliance control module operably coupled with at least one of the drive system or the vacuum collection system, and a plurality of sensors operably coupled with at least the compliance control module and configured to provide outputs related to components and subsystems of the autonomous vacuum cleaner, respectively, to the compliance control module, wherein the compliance control module is configured to monitor the outputs from the plurality of sensors and generate an interrupt configured to modify operation of the autonomous surface cleaning device or cease operation of the autonomous surface cleaning device when at least one output satisfies a predetermined threshold.

DETAILED DESCRIPTION

Aspects of the disclosure relate to autonomous surface cleaning devices for cleaning floor surfaces, including hard surfaces, carpets, and rugs. More specifically, aspects of the disclosure relate to a compliance control module for monitoring one or more compliance-critical functions of an autonomous surface cleaning device, alternatively referred to as a "robot cleaner" or "robot".

In some aspects, all compliance-critical monitoring functions are located in the compliance control module, which can be a module comprising a dedicated, stand-alone microprocessor with or without software designed to execute compliance-critical functions. The compliance control module monitors inputs from various components and subsystems related to compliance-critical functions of the robot, and provides status signals to a main controller of the robot, the main controller having a separate microprocessor.

In some aspects, status signals sent from the compliance control module to the main controller can instruct the main controller to interrupt, modify or cease operation of the robot, whenever predetermined compliance input thresholds are exceeded.

In some aspects, status signals sent from the compliance control module to the main controller indicate to the main controller that the compliance control module has interrupted operation of robot motor functions, because predetermined compliance input thresholds are exceeded.

Figure 1:
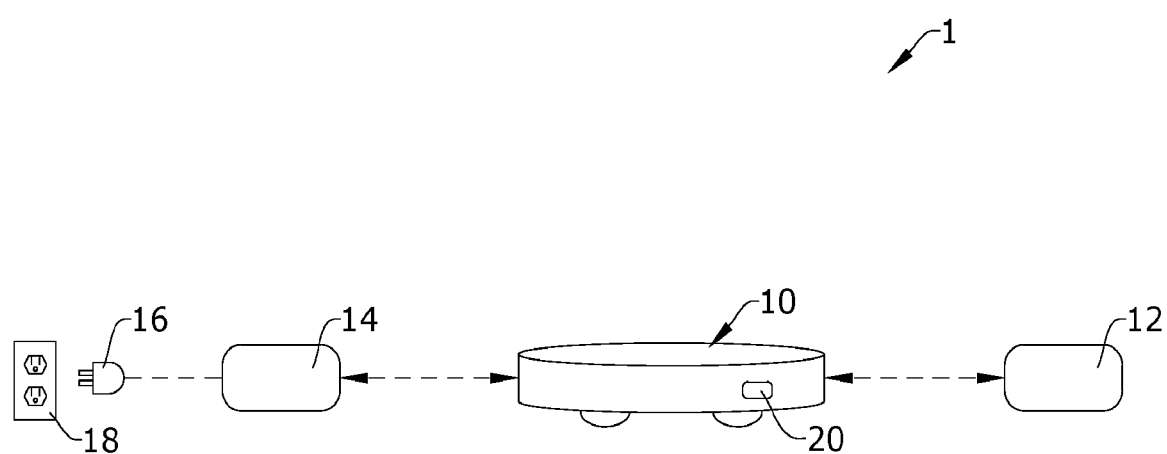
FIG. 1 is a schematic view of an autonomous surface cleaning system having an exemplary autonomous surface cleaning device with a compliance control module according to various aspects described herein.

FIG. 1 is a schematic view of an autonomous surface cleaning system 1. The autonomous surface cleaning system 1 includes an exemplary autonomous surface cleaning device or robot 10 with a compliance control module 20 for monitoring one or more compliance-critical functions of the robot 10 according to various aspects described herein. The compliance control module 20 can be independently responsible for at least one, or any combination, of: (1) restricting the movement of a drive system in response to compliance events from at least one sensor in the robot 10; (2) managing a power source such as a battery pack for at least one, or any combination, of charging, discharging, or temperature; or (3) disabling exposed moving parts of the robot 10 including, but not limited to, a pump, a brush, a vacuum motor, or wheels in response to compliance events from at least one sensor.

Optionally, an artificial barrier system 12 can be provided for containing the robot 10 within a user-determined boundary. Also optionally, a docking station 14 can be provided for recharging a power source 16 on-board the robot 10 and to store the robot 10. The docking station 14 can be connected to a household power supply 18, such as a wall outlet, and can include a converter for converting the AC voltage into DC voltage for recharging the power source 16 on-board the robot 10. The docking station 14 can also include various sensors and emitters for monitoring robot 10 status, enabling auto-docking functionality, communicating with the robot 10, as well as features for network and/or wireless connectivity.

Figure 2:
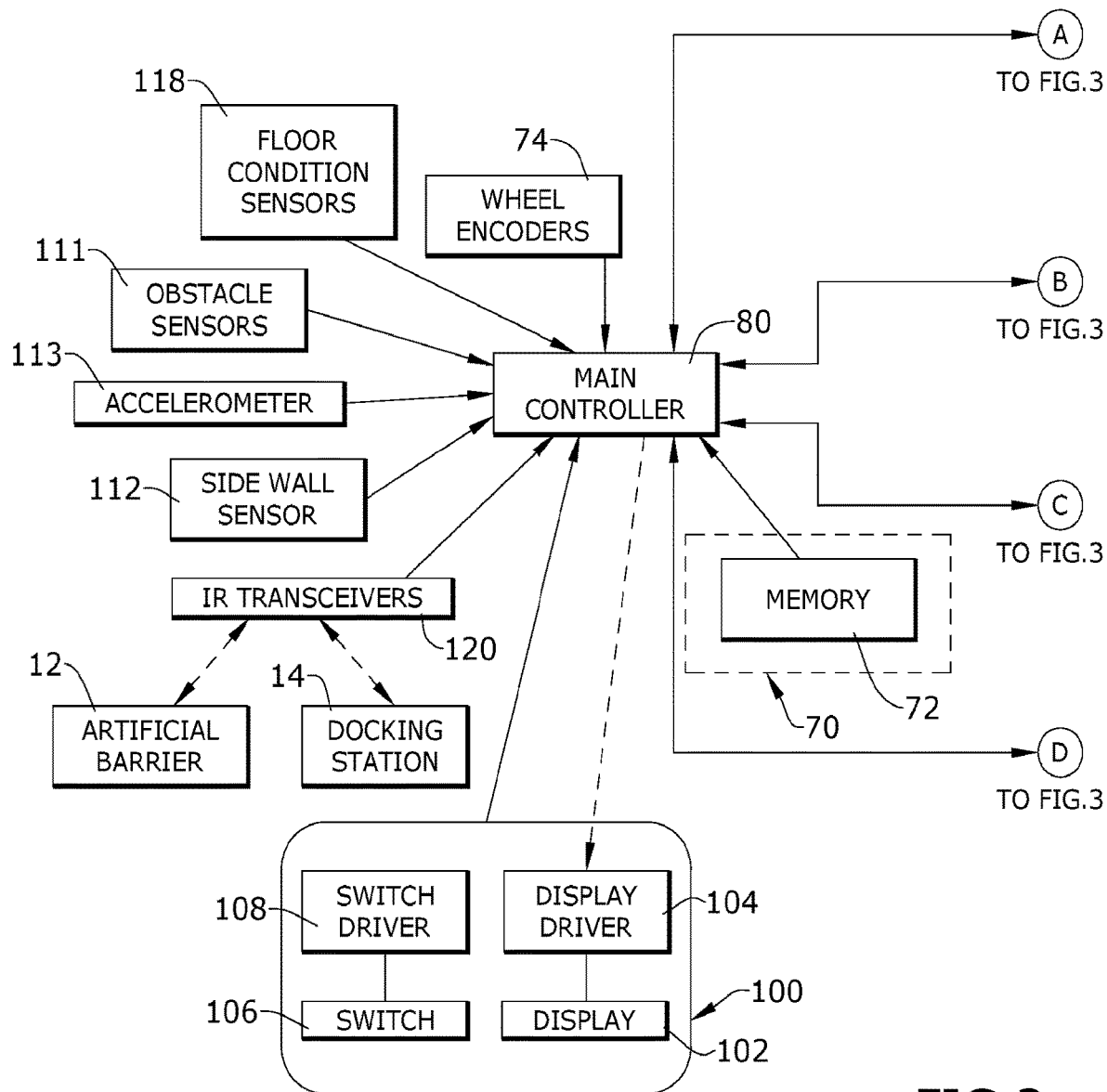
FIG. 2 is a schematic view illustrating functional systems and components of the autonomous surface cleaning device of FIG. 1.
Figure 3:
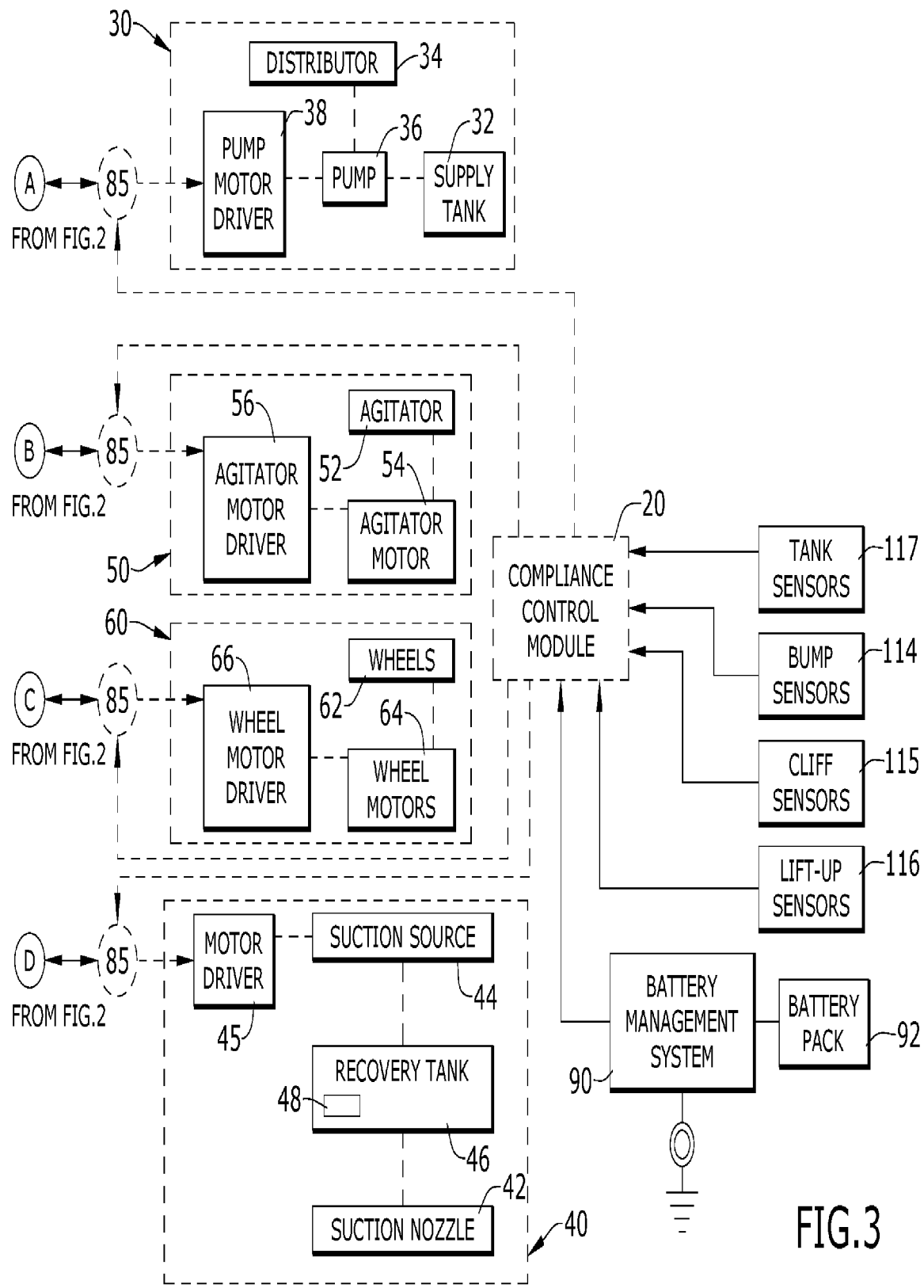
FIG. 3 is a schematic view illustrating additional functional systems and components of the autonomous surface cleaning device of FIG. 1.

FIGS. 2 and 3 illustrate various functional systems and components of the robot 10. It is noted that the robot 10 can be in the form of an autonomous deep cleaner or deep cleaning robot, and is but one example of an autonomous surface cleaning device that is usable with the compliance control module 20. Other autonomous surface cleaning devices that can be utilized with the compliance control module 20 include, but are not limited to, dry vacuuming cleaning robots or autonomous cleaners capable of delivering steam, mist, or vapor to the surface to be cleaned.

The robot 10 mounts the components of various functional systems in an autonomously moveable unit. In the example shown, dashed lines and arrows illustrate signal communications that can occur without being routed through the main controller 80 (FIG. 2), while solid lines and arrows indicate signal communications or transmissions that are routed through the main controller 80. The various functional systems (shown in FIG. 3) can include a fluid supply system 30 for storing cleaning fluid and delivering the cleaning fluid to the surface to be cleaned, a vacuum collection system 40 for removing debris or cleaning fluid from the surface to be cleaned and storing the recovered debris and fluid, an agitation system 50 for agitating the surface to be cleaned, and a drive system 60 for autonomously moving the robot 10 over the surface to be cleaned. The robot 10 can be configured to move randomly about a surface while cleaning the floor surface, using input from various sensors to change direction or adjust its course as needed to avoid obstacles. A navigation/mapping system 70 (shown in FIG. 2) can also be provided in the robot 10 and operably coupled with the drive system 60 for guiding the movement of the robot 10 over the surface to be cleaned, generating and storing maps of the surface to be cleaned, and recording status or other environmental variable information. The robot 10 can include a housing 25 adapted to selectively mount components of the systems to form a unitary movable device. In another example (not shown), the fluid supply system can be eliminated and the autonomous surface cleaning device can be configured as a "dry" vacuum cleaner which collects substantially dry debris and not fluid from a surface to be cleaned.

A main controller 80 (FIG. 2) is operably coupled with at least some of the various functional systems of the robot 10 for controlling its operation. The main controller 80 can be a microcontroller unit (MCU) that contains at least one central processing unit (CPU). In one aspect of the present disclosure the main controller 80 can monitor and control at least the navigation functions of the robot 10.

The compliance control module 20 (FIG. 3) is a microcontroller, separate from the main controller 80, which monitors compliance inputs and provides status information to the main controller 80. The compliance control module 20 provides detailed status information about compliance controls and enables, through a communications interface, including individual discrete outputs that the main controller 80 can use as a basis to generate an interrupt. As used herein, an "interrupt" will refer to a transmission, signal, or instruction to modify or cease operation of a system or component such as that found within the robot 10. In one non-limiting example, the communications interface can be a unidirectional universal asynchronous receiver/transmitter (UART) interface. In another non-limiting example, the communications interface can be an inter-integrated circuit ($I^2C$) bus.

In one aspect of the present disclosure the compliance control module 20 provides information to the main controller 80 and does not receive any information from the main controller 80. This unidirectional communication can prevent any software updates or modifications to the main controller 80 from affecting the performance and security of the compliance control module 20.

The fluid supply system 30 (FIG. 3) can include a supply tank 32 for storing a supply of cleaning fluid and a fluid distributor 34 in fluid communication with the supply tank 32 for depositing a cleaning fluid onto the surface. The cleaning fluid can be a liquid such as water or a cleaning solution specifically formulated for carpet or hard surface cleaning. The fluid distributor 34 can be one or more spray nozzle provided on the housing 25 of the robot 10. Alternatively, the fluid distributor 34 can be a manifold having multiple outlets. A fluid delivery pump or "pump" 36 can be provided in the fluid pathway between the supply tank 32 and the fluid distributor 34 to control the flow of fluid to the fluid distributor 34. A pump motor driver 38 can also be provided to control operation of the pump 36, such as in the form of an integrated circuit (IC) chip. Various combinations of optional components can be incorporated into the fluid supply system 30 as is commonly known in the art, such as a heater for heating the cleaning fluid before it is applied to the surface or one or more fluid control and mixing valves.

The vacuum collection system 40 can include a working air path through the unit having an air inlet and an air outlet, a suction nozzle 42 which is positioned to confront the surface to be cleaned and defines the air inlet, a suction source 44 in fluid communication with the suction nozzle 42 for generating a working air stream, and a recovery tank 46 for collecting dirt from the working airstream for later disposal. The suction nozzle 42 can define the air inlet of the working air path. The suction source 44 can be a vacuum motor carried by the unit, fluidly upstream of the air outlet, and can define a portion of the working air path. A motor driver 45 can be provided for controlling operation of the suction source 44, and can be in the form of an IC chip. The recovery tank 46 can also define a portion of the working air path, and comprise a recovery tank inlet in fluid communication with the air inlet. A separator 48 can be formed in a portion of the recovery tank 46 for separating fluid or entrained dirt from the working airstream. Some non-limiting examples of the separator 48 include an air/liquid separator, one or more cyclone separators, a filter screen, a foam filter, a HEPA filter, a filter bag, or combinations thereof. Optionally, a pre-motor filter and/or a post-motor filter can be provided as well.

The agitation system 50 for agitating the surface to be cleaned can include at least one agitator 52, such as a brushroll mounted for rotation about a substantially horizontal axis, relative to the surface over which the unit moves. A brush drive assembly including a separate, dedicated agitator motor 54 can be provided within the unit to drive the agitator 52. Alternatively, the agitator 52 can be driven by the suction source 44. Other agitators 52 are also possible, including one or more stationary or non-moving brushes or pads, or one or more brushes or pads that rotate about a substantially vertical axis and are driven by one or more dedicated brush motors. An agitator motor driver 56 can be provided to control operation of the agitator motor 54, such as in the form of an IC chip. In addition, while one agitator 52, agitator motor 54, and agitator motor driver 56 is shown in FIG. 2, multiple agitators, agitator motors, or agitator motor drivers can be provided in the robot 10.

While not shown, a squeegee can be provided on the housing 25 of the robot 10, adjacent the suction nozzle 42, and can be configured to contact the surface as the robot 10 moves across the surface to be cleaned. The squeegee can wipe residual liquid from the surface to be cleaned so that it can be drawn into the fluid recovery pathway via the suction nozzle 42, thereby leaving a moisture and streak-free finish on the surface to be cleaned.

The drive system 60 can include drive wheels 62 for driving the robot 10 across a surface to be cleaned. Multiple drive wheels 62 can be operated by a common wheel motor 64. Alternately, individual wheel motors 64 can be coupled with corresponding individual drive wheels 64, such as by a transmission which may include a gear train assembly or another suitable transmission. The drive system 60 can receive inputs from the main controller 80 for driving the robot 10 across a surface, based on inputs from the navigation/mapping system 70. The drive wheels 62 can be driven in in a forward or reverse direction in order to move the robot 10 forwardly or rearwardly. Furthermore, the drive wheels 62 can be operated simultaneously or individually in order to pivot or turn the robot 10 in a desired direction. A wheel motor driver 66 can be provided to control operation of the wheel motor 64 and can also be in the form of an IC chip.

The main controller 80 can receive input from the navigation/mapping system 70 for directing the drive system 60 to move the robot 10 over the surface to be cleaned. The navigation/mapping system 70 can include a memory 72 that stores maps for navigation and inputs from various sensors, which is used to guide the movement of the robot 10. For example, wheel encoders 74 can be placed on the drive shafts of the wheel motors 64, and are configured to measure the distance travelled. This measurement can be provided as input to the main controller 80.

Electrical components of the robot 10 can be electrically coupled to a battery management system 90 (FIG. 3) which includes a rechargeable battery or battery pack 92. In one example, the battery pack 92 can include lithium ion batteries. Charging contacts for the battery pack 92 can be provided on the exterior or housing 25 of the robot 10. The docking station (FIG. 1) can be provided with corresponding charging contacts.

The compliance control module 20 monitors inputs from various components and subsystems related to one or more compliance-critical functions of the robot 10, and provides status signals to the main controller 80 of the robot 10. Either or both of the compliance control module 20 and the main controller 80 can generate an interrupt 85 configured to modify or cease operation of the robot 10 or any system or component thereof. The interrupts 85 can be signals or instructions to cease or modify operation of a selected component or system in the robot 10. In one example, the main controller 80 can generate interrupts 85 for the fluid supply system, the brush system, the drive system, and the vacuum collection system based on status signals from the compliance control module 20. In one example, the compliance control module can interrupt, modify, or cease operation of the robot 10, independently of the main controller 80, when predetermined sensor input thresholds are exceeded. In another example, signals sent from the compliance control module 20 to the main controller 80 can instruct the main controller 80 to interrupt, modify, or cease operation of the robot 10 when predetermined sensor input thresholds are exceeded.

The main controller 80 is further operably coupled with a user interface (UI) 100 (FIG. 2) configured to receive inputs from and provide notifications to a user. The user interface 100 can be used to select an operation cycle for the robot 10 or otherwise control the operation of the robot 10. The user interface 100 can have a display 102, such as a light-emitting diode (LED) display provided on a base or the housing 25 of the robot 10, for providing visual notifications to the user. Examples of such visual notifications can include indications of operational status and diagnostic information such as battery and/or filter life status, wireless connectivity status such as WiFi or Bluetooth, and various error or fault codes, including errors and status information detected by the compliance control module 20. A display driver 104 can be provided for controlling the display 102 and can act as an interface between the main controller 80 and the display 102. The display driver 104 may be an integrated circuit (IC) chip. The robot 10 can further be provided with a speaker (not shown) for providing audible notifications to the user. Examples of audible notifications include announcements such as beeps, tones, a prerecorded voice or a computer generated voice. In still another example, the user interface 100 can be configured as an application on a mobile device (not shown), or configured to receive input from such a mobile device application (not shown). In such a case, notifications as described above can be presented to a user via the application on the mobile device, and the user can select an operation cycle or otherwise control operation of the robot 10 via the application.

The user interface 100 can further have one or more switches 106 that are actuated by the user to provide input to the main controller 80 to control the operation of various components of the robot 10. For example, one of the switches 106 may be a suction power switch that can be selectively closed by the user to activate the suction source 44. Another one of the switches 106 can be coupled with a configurable display 102 to select an operating mode, set a power level or runtime, input a cleaning schedule, configure a notification, or input a password for the robot 10, in non-limiting examples. A switch driver 108 can be provided for controlling the switches 106 and can act as an interface between the main controller 80 and the switches 106.

The main controller 80 and compliance control module 20 can further be operably coupled with various sensors for receiving input about the environment and can use the sensor input to control the operation of the robot 10. In one aspect of the disclosure, sensors critical to the compliance control operation (e.g. collision, exposure, and edge sensing) can be directly connected to the compliance control module 20, with the compliance control module 20 forwarding necessary sensor details to the main controller 80 as needed. This arrangement reduces the likelihood of the main controller 80 implementation impacting the operation of the compliance control module 20. Subsequently, the operational software of the main controller 80 can be modified without impacting compliance functions performed by the compliance control module 20. Sensor input to the compliance control module 20 can also be used to interrupt one or more of the motor drivers 38, 45, 56, 66 as discussed in further detail below. The sensor input to the main controller 80 and/or the compliance control module 20 can further be stored in the memory 72 or otherwise used by the navigation/mapping system 70 to develop maps for navigation. Some exemplary sensors are illustrated in FIGS. 2 and 3, although it is understood that not all sensors shown may be provided, additional sensors not shown may be provided, and that the sensors can be provided in any combination.

The robot 10 can include one or more sensor(s) for determining the position of the robot 10 relative to objects and its location within an environment. For example, one or more infrared (IR) obstacle sensors 111 can be provided for distance sensing. The obstacle sensors 111 can be mounted to the housing 25 of the robot 10, for example to determine the distance to obstacles in front of the robot 10. Input from the obstacle sensors 111 can be used to slow down and/or adjust the course of the robot 10 when objects are detected. Additional sensors can be provided for position sensing, such as at least one of, or a combination of, a camera, imager, laser rangefinder, or radio-frequency-based time-of-flight sensor, for determining the position and location of the robot 10.

In addition to the obstacle sensors 111, the navigation/mapping system 70 can include additional sensors, including a wall-following or side wall sensor 112 and an accelerometer 113. The side wall sensor 112 can be located near the side of the robot 10 and can include a side-facing optical position sensor that provides distance feedback to the main controller 80 which controls the drive wheels 62 so that the robot 10 can follow near a wall without contacting the wall. In addition to optical sensors, the side wall sensor 112 can be a mechanical or ultrasonic sensor.

The accelerometer 113 can be an integrated inertial sensor located on the main controller 80, and in one option can be a nine-axis gyroscope or accelerometer to sense linear, rotational and magnetic field acceleration. The accelerometer 113 can use acceleration input data to calculate and communicate change in velocity and pose to the main controller 80 for navigating the robot 10 around the surface to be cleaned.

Bump sensors 114 can be provided for determining front or side impacts to the robot 10. The bump sensors 114 may be integrated with a bumper 26 on the housing 25 of the robot 10. Cliff sensors 115 can also be provided for avoiding excessive drops such as stairwells or ledges. The cliff sensors 115 can be bottom-facing optical position sensors that provide distance feedback to the compliance control module 20. In addition to optical sensors, the cliff sensors 115 can be mechanical or ultrasonic sensors. The robot 10 can further include one or more lift-up sensors 116 that can detect when the robot 10 is lifted off the surface to be cleaned, such as when a user picks up the robot 10.

The robot 10 can optionally include one or more tank sensors 117 for detecting the presence (or absence) of the supply and recovery tanks 32, 46. For example, the tank sensors 117 can be in the form of one or more pressure sensors for detecting the weight of the supply tank 32 and the recovery tank 46. This information is provided as an input to the compliance control module 20. In one example, the compliance control module 20 can be configured to generate an interrupt 85 until output from the tank sensors 117 indicates that both the recovery tank 46 and supply tank 32 are present or properly installed. The main controller 80 may also direct the display 102 to provide a notification to the user that the supply tank 32 or recovery tank 46 is missing. In this manner, the compliance control module 20 can prevent operation of the robot 10 until both the supply tank 32 and the recovery tank 46 are detected.

The robot 10 can further include one or more floor condition sensors 118 for detecting a condition of the surface to be cleaned. For example, the robot 10 can be provided with an infrared dirt sensor, a stain sensor, an odor sensor, and/or a wet mess sensor. The floor condition sensors 118 provide input to the main controller 80, which may direct operation of the robot 10 based on the condition of the surface to be cleaned, such as by selecting or modifying a cleaning cycle.

The robot 10 can further include one or more IR transceivers 120 for communicating with peripheral devices such as the docking station 14 and/or artificial barrier system 12 (described below). The one or more IR transceivers 120 on the robot 10 and corresponding transceivers on the associated peripheral device can be set up on a frequency-based communication protocol such that each pair of associated IR transceivers can be configured to transfer distinct code sets, which can comprise a variety of different instructions with predefined responses.

For example, the robot 10 can communicate with the docking station 14 via IR transceivers during a robot homing process. The robot 10 can initiate the homing process by turning on its IR transceivers 120 and searching for corresponding IR signals emitted by transceivers on the docking station 14 that can be used to guide the robot 10 to the docking station 14, such as by emitting signals to instruct the robot 10 to maneuver left, right or straight towards the docking station 14.

The artificial barrier system 12 can include an artificial barrier generator that comprises a housing with at least one sonic receiver for receiving a sonic signal from the robot 10 and at least one IR transmitter for emitting an encoded IR beam towards a predetermined direction for a predetermined period of time. The artificial barrier generator can be battery-powered by rechargeable or non-rechargeable batteries. In one aspect of the disclosure, the sonic receiver can comprise a microphone configured to sense a predetermined threshold sound level, which corresponds with the sound level emitted by the robot 10 when it is within a predetermined distance away from the artificial barrier generator. Optionally, the artificial barrier generator can further comprise a plurality of IR emitters near the base of the housing configured to emit a plurality of short field IR beams around the base of the artificial barrier generator housing. The artificial barrier generator can be configured to selectively emit one or more IR beam(s) for a predetermined period of time, but only after the microphone senses the threshold sound level, which indicates the robot 10 is nearby. Thus, the artificial barrier generator is able to conserve power by emitting IR beams only when robot 10 is in the vicinity of the artificial barrier generator.

The robot 10 can have a plurality of IR transceivers around the perimeter of the unit to sense the IR signals emitted from the artificial barrier generator and output corresponding signals to the main controller 80, which can adjust drive wheel 62 control parameters to adjust the position of the robot 10 to avoid the boundaries established by the artificial barrier encoded IR beam and the short field IR beams. This prevents the robot 10 from crossing the artificial barrier boundary and/or colliding with the artificial barrier generator housing.

Audible sound waves, or inaudible ultrasonic waves emitted from the robot 10 greater than a predetermined threshold frequency level is sensed by the microphone and triggers the artificial barrier generator to emit one or more encoded IR beams as described previously for a predetermined period of time. The IR transceivers on the robot 10 sense the IR beams and output signals to the main controller 80, which then manipulates the drive system 60 to adjust the position of the robot 10 to avoid the border established by the artificial barrier system 12 while continuing to perform a cleaning operation on the surface to be cleaned.

In operation, the compliance control module 20 can monitor inputs from various compliance-monitoring sensors related to compliance-critical functions of the robot 10. Information about sensor status or compliance events can be provided as an input to the compliance control module 20. For example, the compliance control module 20 can be responsible for generating an interrupt 85 to restrict the movement of the drive system 60 in response to compliance events from bump sensors 114 and cliff sensors 115. The compliance control module 20 can also generate an interrupt 85 to disable exposed moving parts including, but not limited to, the pump 36, the agitator 52, the suction source 44, and/or the drive wheels 62 in response to compliance events from lift-up sensors 116. As used herein, exposed moving parts are any moving parts of the robot 10 that are exposed outside the housing 25.

In another example of operation, the compliance control module 20 can relay information about sensor status, compliance events, or generated interrupts to the main controller 80. Such information can be transmitted directly to the main controller 80, such as via a direct connection (not shown). Alternately, information about sensor status or compliance events can be relayed indirectly to the main controller 80. In one example, the compliance control module 20 can generate an interrupt 85 to cease operation of the pump 36 during execution of a cleaning cycle or program, for example due to output from the lift-up sensors 116 that indicate the robot 10 has been lifted off the surface. The main controller 80 can monitor input from the pump 36 and detect its inoperative status during the cleaning cycle, and indirectly detect, infer, or confirm that an interrupt 85 was transmitted to the pump 36 by the compliance control module 20. The main controller 80 can be further configured to generate additional interrupts 85 for other components or systems within the robot 10 based on the indirect detection of the interrupt 85 for the pump 36.

In another example of operation, the compliance control module 20 can transmit a status signal to the main controller 80 which can include information about one or more sensors in the robot 10. The main controller 80 can generate an interrupt 85 based on the transmitted status signal or based on output from the sensors, such as to halt operation of the pump 36, agitator motor 54, suction source 44, and/or wheel motors 64. Additionally, the lift-up sensors 116 may also detect when the robot 10 is in contact with the surface to be cleaned, such as when the user places the robot 10 back on the ground. Upon such input, the main controller 80 may resume operation of the pump 36, agitator motor 54, suction source 44, and/or wheel motors 64.

In still other examples of operation, output signals from the bump sensors 114 can provide inputs to the compliance control module 20, which relays the information to the main controller 80 for selecting an obstacle avoidance algorithm based thereon. Output signals from the cliff sensors 115 can also provide inputs to the compliance control module 20, which relays the information to the main controller 80 to control the robot 10 so that the robot 10 can avoid excessive drops.

It is contemplated that the compliance control module 20 can include software designed to be Underwriters Laboratories (UL) Class B compliant and to meet the requirements of UL 1017 Table 31 and in accordance with paragraph 4.11.4.3. UL 1017 pertains to motor-operated vacuum cleaners and blower cleaners, floor sweepers, and to household use floor finishing machines. The software is designed to be UL Class B in accordance with CAN/CSA-E60730-1 and UL 60730-1, Annex H, Clause H.11.12.3. Other aspects of the compliance control module 20 can include software designed to be compliant with other standards.

By partitioning control of various components and subsystems of the robot 10, in particular the various sensors which provide input used to control the robot 10, between two separate controllers, i.e. the compliance control module 20 and the main controller 80, the main controller 80 does not have to be UL certified or UL compliant, i.e. it may not be UL Class B compliant and may not meet the requirements of UL 1017 Table 31 and in accordance with paragraph 4.11.4.3.

Figure 4:
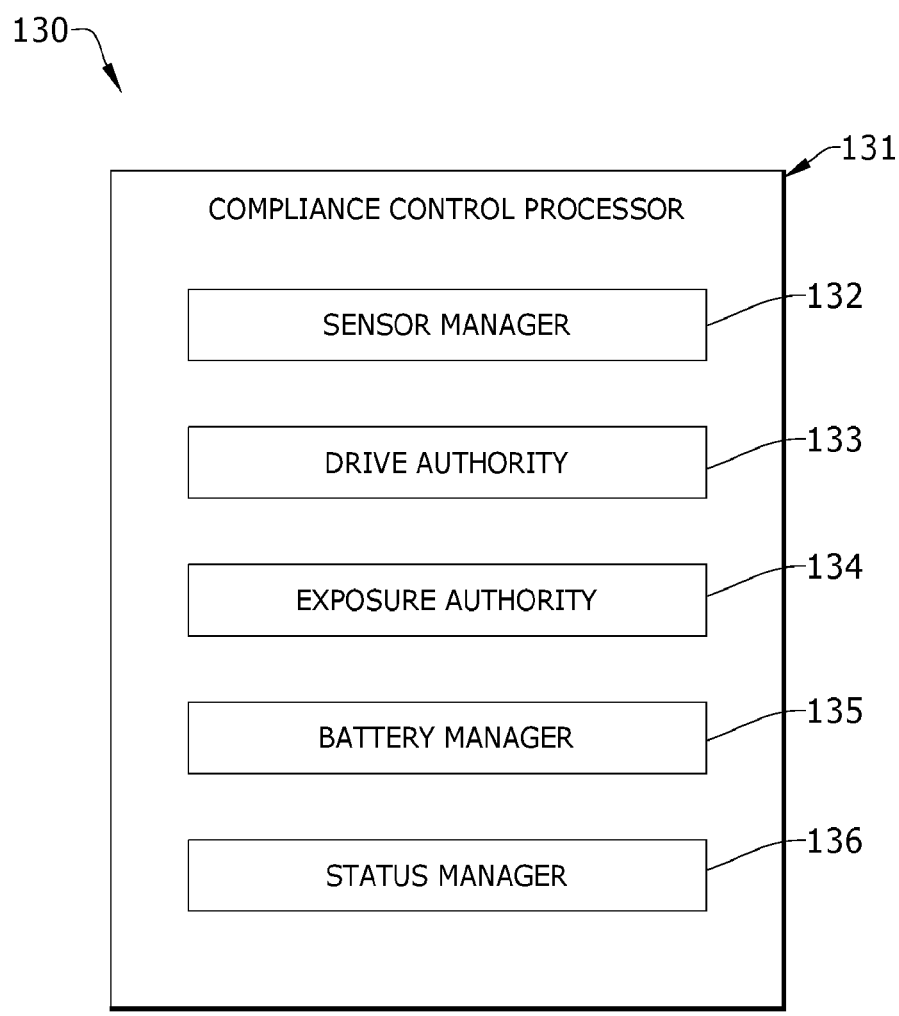
FIG. 4 is a schematic diagram illustrating a software architecture for the compliance control module of FIG. 1.

One aspect of a general software architecture 130 for the compliance control module is shown in FIG. 4, and includes a compliance control processor 131 having multiple process types, including a sensor manager 132, a drive authority 133, an exposure authority 134, a battery manager 135, or a status manager 136, or any combination thereof. Other aspects of a general software architecture for the compliance control module 20 may have fewer or additional process types.

The sensor manager 132 is responsible for sensor data collection, and in the illustration is operably coupled with the bump sensors 114, cliff sensors 115, lift-up sensors 116, and the tank sensors 117 (FIG. 3) for data collection from these sensors. The sensor manager 132 can further be responsible for sensor stimulation for failure determination of mechanical sensors. For this, the sensor manager 132 can periodically toggle any mechanical sensors to determine the sensors are not stuck in one position.

The drive authority 133 is responsible for determining if a drive component, such as one of the wheel motors 64, needs to be interrupted i.e. prevented from driving the associated drive wheel, or released from an interrupted state due to sensor data provided. The drive authority 133 also provides discrete status information back to the main controller 80. For example, the drive authority 133 can provide information on the condition under which one of the wheel motors 64 is interrupted.

The exposure authority 134 is responsible for determining if an exposed moving part needs to be interrupted, i.e. prevented from operating or stopped if in operation, or released from an interrupted state due to sensor data provided. The exposure authority 134 also provides discrete status information back to the main controller 80. For example, the exposure authority 134 can provide information on the condition under which one of the exposed moving parts is interrupted. Examples of exposed moving parts may include, but not limited to, the pump 36, the agitator 52, the suction source 44, or the drive wheels 62 shown in FIGS. 2 and 3.

In some aspects of the present disclosure, multiple drive authorities or exposure authorities may be provided. For example, in an autonomous surface cleaning device with multiple individually-controllable drive wheels, a drive authority can be provided for each drive wheel. In another example, in an autonomous surface cleaning device with multiple exposed moving parts, an exposure authority can be provided for each moving part.

The battery manager 135 is responsible for controlling the charging function of the power source 16 (e.g. the battery pack 92) as well as monitoring voltage, current, and temperature of the power source 16.

The status manager 136 is responsible for reporting to the main controller 80 status of the interrupts 85 and other outputs from the aforementioned authorities.

Figure 5:
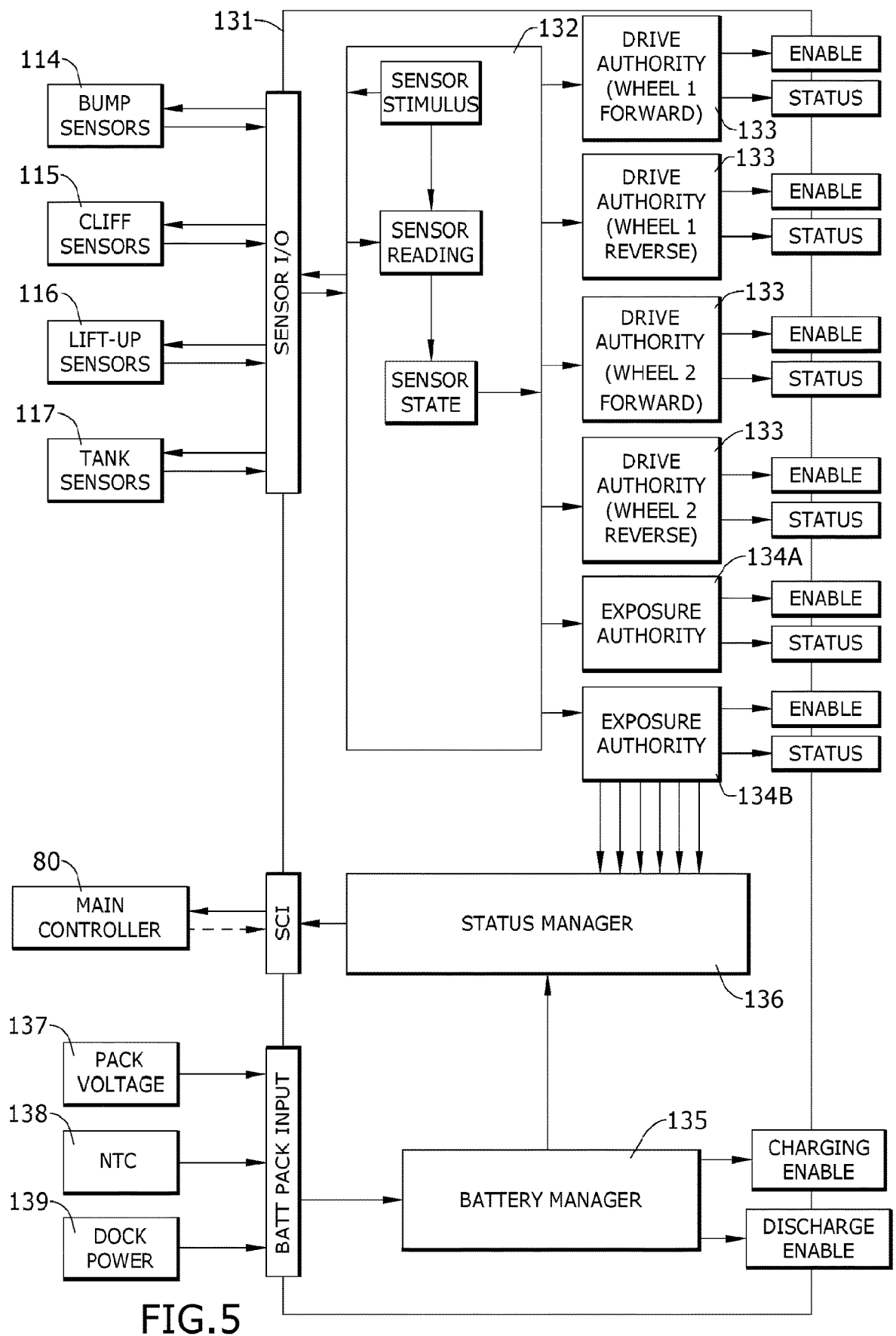
FIG. 5 is a block diagram illustrating software functions in the software architecture of FIG. 4.

A block diagram of one aspect of the software functions for the compliance control module 20 is shown in FIG. 5. In the illustrated example, the compliance control module 20 is used to control an example of the robot 10 where the drive system 60 includes two drive wheels 62, each of which has an associated wheel motor 64 and wheel motor driver 66. Each drive wheel 62 is capable of being driven in a forward or reverse direction. Drive authorities 133 are provided for each operational direction of each wheel motor 64, i.e. four drive authorities 133 in the present example. Each drive authority 133 can send at least two discrete messages to the main controller 80, including an enable message which causes an interrupt 85 and a status message which provides condition or status information back to the main controller 80. For example, the drive authority 133 can provide information on the condition under which one of the wheel motors 64 is interrupted. The compliance control module 20 can be responsible for making the decision to restrict the wheel motor 64 operation based upon logic that is unique for each wheel motor 64. For this reason, there are multiple independent drive authorities 133 for the drive system 60 of the robot 10.

Also in FIG. 5, the compliance control processor 131 further includes an agitator exposure authority 134A for determining if the agitator 52 is to be interrupted, i.e. prevented from operating or stopped if in operation, or released from an interrupted state due to sensor data provided, and a suction source exposure authority 134B for determining if the suction source needs to be interrupted, i.e. prevented from operating or stopped if in operation, or released from an interrupted state due to sensor data provided. Each exposure authority 134A, 134B can send at least two discrete messages to the main controller 80, including an enable message, which causes an interrupt 85, and a status message, which provides condition or status information back to the main controller 80. For example, the exposure authorities 134A, 134B can provide information on the condition under which the agitator or suction source is interrupted.

As discussed above, the sensor manager 132 is responsible for sensor data collection. i.e. sensor reading, and in the illustrated example is operably coupled with the bump sensors 114, cliff sensors 115, lift-up sensors 116, and the tank sensors 117 (FIG. 3) for data collection from these sensors. The compliance control processor 131 can further include a sensor input/output for communicating with the bump sensors 114, cliff sensors 115, lift-up sensors 116, and tank sensors 117. The sensor manager 132 can further provide sensor state information to the various drive authorities 133 and the exposure authorities 134A, 134B.

The sensor manager can also perform sensor stimulus for failure determination of sensors, particularly mechanical sensors. For this, the sensor manager can periodically toggle any of the bump sensors, cliff sensors, lift-up sensors, or the tank sensors to determine the sensors are not stuck in one position.

The battery manager 135 can control the charging function of the battery pack 92 (FIG. 3) and monitors voltage, current, and temperature of the battery pack 92. The compliance control processor 131 can further include a power source input for communicating with a pack voltage sensor (137), a negative temperature coefficient (NTC) sensor (138) which detects battery temperature, and an input power sensor (139) indicating presence of a source of power sufficient to charge the battery pack 92. The battery manager 135 can further send at least two discrete outputs or messages to the main controller 80, including a charging enable message when the robot 10 is docked with the docking station 14 and a discharging enable message which when the robot 10 disengages from the docking station 14.

The status manager 136 can receive inputs from the drive authorities 133, the exposure authorities 134A, 134B, and the sensor manager 132, and reports the status of interrupts 85 to the main controller 80. The compliance control processor 131 can further include a serial communications interface (SCI) for communication between the status manager 136 and the main controller 80. In one non-limiting example, the serial communications interface can be a unidirectional universal asynchronous receiver/transmitter (UART) interface. In another non-limiting example, the serial communications interface can be an PC bus.

Status messages that are sent over the serial communications interface to the main controller 80 provide detailed information needed by the main controller 80 to make decisions. It should be understood that sending messages "to the main controller 80" can include direct or indirect transmission or communication modes. For example, the compliance control module 20 can send status messages over the serial communications interface, and the main controller 80 can monitor the serial communications interface for new or changing status messages, thereby indirectly sending a status message to the main controller 80 via the serial communications interface. Status messages can be provided at different rates, including at a predefined interval, periodic intervals, or as needed. Some non-limiting categories of status messages include: compliance status messages, bumper status messages, cliff status messages, battery status messages, and version messages.

Compliance status messages are sent by the compliance control module 20 to the main controller 80 and include a summary of the compliance status of the robot 10. The compliance status messages can be transmitted by the compliance control module 20 at regular periodic intervals, such as, but not limited to, regular period intervals ranging between 1 Hz and 8 Hz.

Bumper status messages are sent by the compliance control module 20 to the main controller 80 and include a summary of the bumper status of the robot 10. The bumper status messages can be sent as needed, such as when a bump sensor 114 is activated, and are nominally not sent. In one non-limiting example, a bumper status message can be sent at a rate of 4 Hz when the bumper collides with an object, and another bumper status message can be sent at a rate of 4 Hz for one second after the bumper clears the object.

Cliff status messages are sent by the compliance control module 20 to the main controller 80 and include a summary of the cliff status of the robot 10. The cliff status messages can be sent as needed, such as when a cliff sensor 115 is activated, and are nominally not sent. In one non-limiting example, a cliff status message can be sent at a rate of 4 Hz when the cliff sensor 115 detects a cliff, and another cliff status message can be sent at a rate of 4 Hz for one second after the robot 10 is clear of the cliff.

Battery status messages are sent by the compliance control module 20 to the main controller 80 and include a summary of the battery status of the robot 10. The battery status messages can be sent at regular periodic intervals, such as, but not limited to, at a rate of 1 Hz.

Version messages are sent by the compliance control module 20 to the main controller 80 and include version information about the software for the compliance control module 20. The version messages can be sent at a combination of predefined and periodic intervals, such as, but not limited to, one minute after the robot 10 is powered on and every 15 minutes thereafter.

Figure 6:
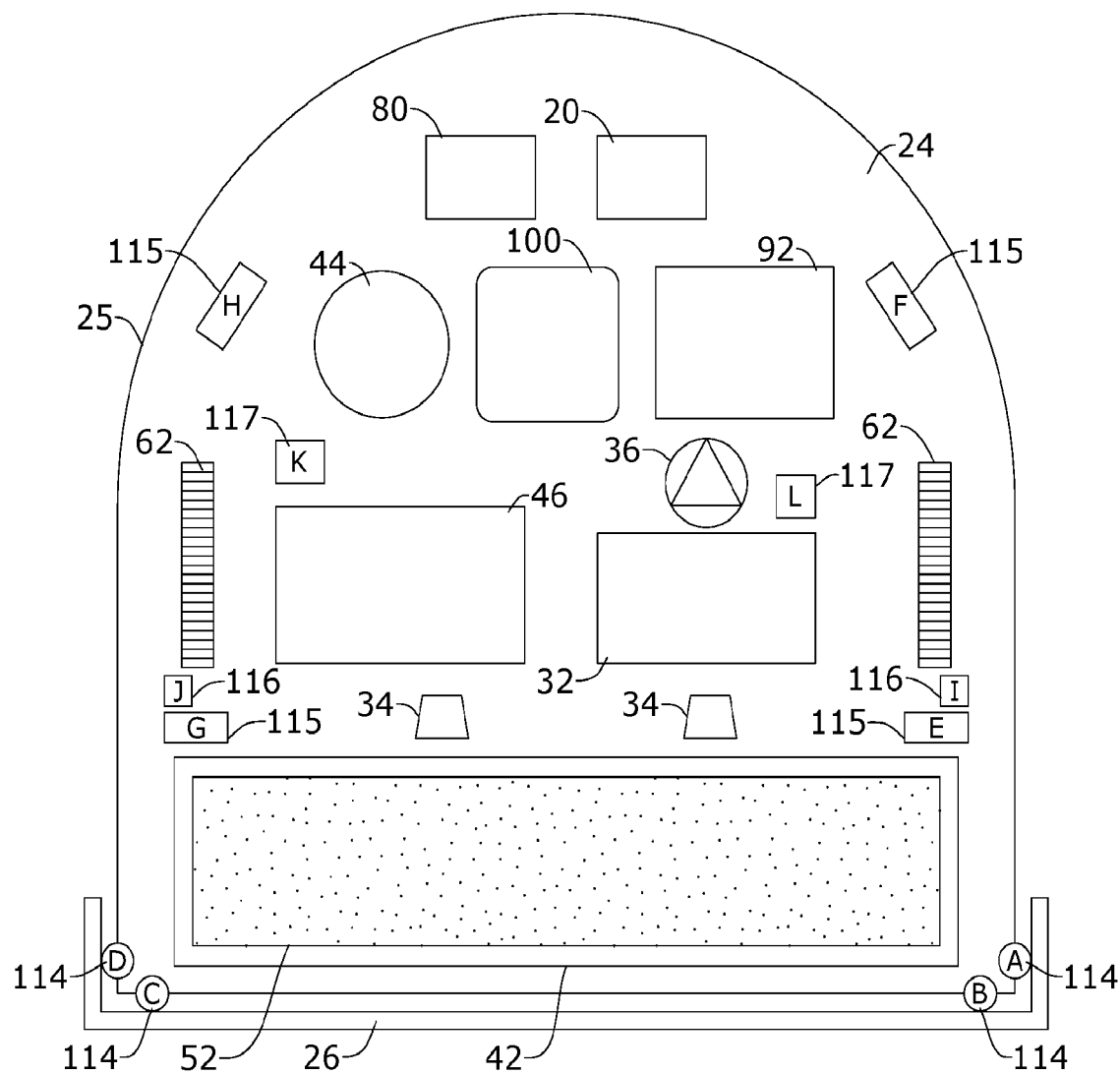
FIG. 6 is a schematic bottom view of the autonomous surface cleaning device of FIG. 1.

FIG. 6 is a schematic view of the robot 10, in particular showing the various sensors described above that can provide input to the compliance control module 20. It is noted that not all components of the robot 10 are shown in FIG. 6, but rather as many components as necessary for a discussion of the sensor inputs to the compliance control module 20 and corresponding action.

The robot 10 can include a base 24 associated with the housing 25 and adapted for movement over a surface to be cleaned. The drive system 60 can be associated with the base 24 and configured to move the base 24 over the surface to be cleaned.

The robot 10 includes the bumper 26 on the housing 25, and four bump sensors 114 are positioned on the bumper 26. Two of the bump sensors 114 can be front bump sensors labeled "B" and "C" and positioned to detect front impacts. Two of the bump sensors 114 can be side bump sensors labeled "A" and "D" and positioned to detect side impacts.

Table 1 shows one example of a bumper behavior profile for the robot 10, which includes the reaction of the robot 10 in response to activation of the bump sensors A-D. In general, for a front bumper activation in which one of the front bump sensors B or C are activated due to a front impact, forward motion of the drive wheels 62 is restricted by an interrupt 85, i.e. a message sent by the compliance control module 20 to the main controller 80. A side bumper activation in which one of the side bump sensors A and D are activated due to a side impact, motion of the drive wheels 62 is restricted to rotation away from the side impact by an interrupt 85, i.e. a message sent by the compliance control module 20 to the main controller 80. For a situation where both bump sensors on one side of the robot 10 are activated simultaneously, i.e. sensors A and B or C and D, forward motion of the drive wheel 62 on the corresponding side of the robot 10 is restricted along with a rotation away from the corresponding side. For each restriction situation, the interrupt 85 can also be accompanied by a status message with information about the condition under which drive wheel 62 movement is restricted.

TABLE 1

Bumper Behavior Profile for Autonomous Surface Cleaning Device

| Sensor Activated | | | | Movement Restricted | | | |
|---|---|---|---|---|---|---|---|
| A | B | C | D | Wheel 1 Forward | Wheel 1 Reverse | Wheel 2 Forward | Wheel 2 Reverse |
|   |   |   | X | X |   |   | X |
|   | X |   |   | X |   | X |   |
|   | X | X |   | X |   | X | X |
| X | X |   |   | X |   |   | X |
| X | X | X |   | X |   | X | X |
|   | X | X |   | X |   |   | X |
|   | X | X | X | X |   | X | X |
| X |   |   |   |   | X | X |   |
| X |   |   | X | X | X | X |   |
| X |   | X |   | X | X | X |   |
| X | X |   |   | X | X | X |   |
| X | X |   | X | X | X | X | X |
| X | X | X |   | X | X | X |   |
| X | X | X | X | X | X | X | X |

In the illustrated example, the robot 10 includes four cliff sensors 115 although any number of cliff sensors can be utilized. Two front cliff sensors 115 labeled "E" and "G" can be positioned to detect cliffs at the front of the robot 10, and two rear cliff sensors 115 labeled "F" and "H" can be positioned to detect cliffs at the rear of the robot 10. Other arrangement of cliff sensors are possible to sense cliffs during both forward and reverse travel. Table 2 shows one example of a cliff behavior profile for the robot 10, which includes the reaction of the robot 10 in response to activation of the cliff sensors E-H. In general, for a front cliff activation in which one of the front cliff sensors E or G are activated, forward motion of the drive wheels 62 is restricted by an interrupt 85, i.e. a message sent by the compliance control module 20 to the main controller 80. For a rear cliff activation in which one of the rear cliff sensors F or H are activated, reverse motion of the drive wheels 62 is restricted by an interrupt 85, i.e. a message sent by the compliance control module 20 to the main controller 80. For a situation where both cliff sensors on one side of the robot 10 are activated simultaneously, i.e. cliff sensors E and F or G and H, all motion of the drive wheels 62 is restricted. For each restriction situation, the interrupt 85 can also be accompanied by a status message with information about the condition under which wheel movement is restricted.

TABLE 2

Cliff Behavior Profile for Autonomous Surface Cleaning Device

| Sensor Activated | | | | Movement Restricted | | | | |
|---|---|---|---|---|---|---|---|---|
| E | F | G | H | Wheel 1 Forward | Wheel 1 Reverse | Wheel 2 Forward | Wheel 2 Reverse | Brush |
|   |   | X |   |   |   |   | X |   |
|   | X |   |   | X |   | X |   |   |
|   | X | X |   | X | X | X | X | X |
| X |   |   |   |   | X |   |   |   |
| X |   | X |   |   | X |   | X |   |
| X | X |   |   | X | X | X |   |   |
| X | X | X |   | X | X | X | X | X |
| X |   |   | X |   | X |   | X |   |
| X |   | X | X |   | X | X | X |   |
| X | X |   | X | X | X |   |   |   |
| X | X | X | X | X | X | X | X |   |
| X | X |   |   | X | X | X |   | X |
| X | X |   | X | X | X | X |   |   |
| X | X | X |   | X | X | X | X | X |
| X | X | X | X | X | X | X | X | X |

In some cliff situations, the agitator 52 may be optionally controlled in response to input from the cliff sensors E-H. In general, for a cliff activation where both cliff sensors 115 on at least one side of the robot 10 are activated simultaneously, i.e. sensors E and F or G and H, motion of the agitator 52 is restricted. The interrupt 85 can also be accompanied by a status message with information about the condition under which agitator movement is restricted. While not shown in Table 2, in some cliff situations, the pump 36 may also be optionally controlled in response to input from the cliff sensors E-H.

In the illustrated example, the robot 10 includes two lift-up sensors 116 although any number of lift-up sensors can be utilized. The two lift-up sensors 116 are labeled "I" and "J" and are shown as being provided at opposite lateral sides of the robot 10. Table 3 shows one example of a lift-up behavior profile for the robot 10, which includes the reaction of the robot 10 in response to activation of the lift-up sensors I and J. In general, for a lift-up activation in which at least one of the lift-up sensors I or J are activated, all motion of the drive wheels 62, agitator 52, suction source 44, and pump 36 is restricted. The interrupt 85 can also be accompanied by a status message with information about the conditions under which the drive wheels 62, agitator 52, suction source 44, and pump 36 are restricted.

TABLE 3

Lift-Up Behavior Profile for Autonomous Surface Cleaning Apparatus

| Sensor Activated | | Movement Restricted | | | | | Power Restricted | |
|---|---|---|---|---|---|---|---|---|
| | | Wheel 1 | Wheel 1 | Wheel 2 | Wheel 2 | | Vacuum | Pump |
| I | J | Forward | Reverse | Forward | Reverse | Brush | Motor | Motor |
| X | | X | X | X | X | X | X | X |
| | X | X | X | X | X | X | X | X |

In the illustrated example, the robot 10 includes two tank sensors 117 labeled "K" and "L" provided for detecting the presence or absence of the recovery tank 46 and the supply tank 32, respectively. Any number of tank sensors can be utilized. Table 4 shows one example of a tank absence behavior profile for the robot 10, which includes the reaction of the robot 10 in response to the presence or absence of either tank. In general, for a tank sensor activation in which at least one of the tank sensors K or L are activated, i.e. when at least one of the tanks is absent, all motion of the drive wheels 62, agitator 52, suction source 44, and pump 36 is restricted. The interrupt 85 can also be accompanied by a status message with information about the condition under which the drive wheels 62, agitator 52, suction source 44, and pump 36 are restricted.

TABLE 4

Tank Absence Behavior Profile for Autonomous Surface Cleaning Apparatus

| Sensor Activated | | Movement Restricted | | | | | Power Restricted | |
|---|---|---|---|---|---|---|---|---|
| | | Wheel 1 | Wheel 1 | Wheel 2 | Wheel 2 | | Vacuum | Pump |
| K | L | Forward | Reverse | Forward | Reverse | Brush | Motor | Motor |
| X | | X | X | X | X | X | X | X |
| | X | X | X | X | X | X | X | X |

There are several advantages of the present disclosure arising from the various features of the autonomous surface cleaning apparatus described herein. One of the benefits of at least some of the disclosed compliance control module aspects described herein is that by providing an additional controller to the main controller and partitioning control of various components and subsystems of the robot, in particular the various sensors which provide input used to control the autonomous vacuum cleaner, between two separate controllers, new software and updates can be provided to one controller without affecting the other controller, i.e. the compliance control module.

Another advantage of some of the compliance control module aspects disclosed herein is that the compliance control module is designed to ensure the main controller and operation of the robot comply with UL requirements without the need to test and analyze each individual control module and customized software configuration. Instead, the compliance control module can be incorporated on different robots and autonomous vacuum cleaners with minimal modifications. Thus, upon obtaining initial UL approval of the compliance control module, the architecture of the compliance control module can be substantially reused or incorporated into new and derivative autonomous products with minimal design changes. And because the compliance control module can serve as a single point fail-safe system, the amount of testing, time, effort, and cost required to obtain UL approval on individual robot cleaners can be reduced.

To the extent not already described, the different features and structures of the various embodiments of the invention, may be used in combination with each other as desired, or may be used separately. That one autonomous vacuum cleaner is illustrated herein as having all of these features does not mean that all of these features must be used in combination, but rather done so here for brevity of description. Furthermore, while the vacuum cleaner shown herein is autonomous, some features of the invention may be useful on non-autonomous vacuum cleaners. Thus, the various features of the different embodiments may be mixed and matched in various extraction cleaner configurations as desired to form new embodiments, whether or not the new embodiments are expressly described.

While the invention has been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

It is intended that the following concepts can define at least a portion of the scope of the disclosure and that the apparatus and/or method(s) within the scope of these concepts and their equivalents be covered thereby. The disclosure should be understood to include all novel and non-obvious combinations of elements described herein, and the concepts may be presented in this or a later application to any novel and non-obvious combination of these elements. Any aspect of any embodiment can be combined with any aspect of any of the other embodiments. Moreover, the foregoing embodiments are illustrative, and no single feature or element is essential to all possible combinations that may be included in this or a later application. For example, other inventions arising from this disclosure may include any combination of the following concepts set forth below:

The autonomous surface cleaning device described herein wherein the compliance control module is further configured to transmit the at least one status message at a regular periodic interval.

The autonomous surface cleaning device described herein wherein the compliance control module is configured to generate the interrupt until the output indicates that both the recovery tank and the supply tank are present.

The autonomous surface cleaning device described herein wherein the tank sensor is a pressure sensor configured to detect a weight of at least one of the supply tank or the recovery tank.

The autonomous surface cleaning device described herein and further comprising a navigation system operably coupled to the drive system and the main controller and wherein the main controller is further configured to monitor and control the navigation system.

The autonomous surface cleaning device described herein wherein the user interface is located on the base.

What is claimed is:

1. An autonomous surface cleaning device comprising:
    a base adapted for movement over a surface to be cleaned;
    a drive system associated with the base and configured to move the base over the surface to be cleaned;
    a vacuum collection system for removing at least debris from the surface to be cleaned;
    a main controller operably coupled with the drive system and the vacuum collection system, the main controller including a first microcontroller unit having a plurality of first non-transitory instructions stored on a first computer readable storage medium and executable with at least a first central processing unit, the main controller configured to control the drive system and the vacuum collection system according to the first non-transitory instructions;
    a compliance control module operably coupled with the drive system and the vacuum collection system, the compliance control module including a second microcontroller unit having a plurality of second non-transitory instructions stored on a second computer readable storage medium and executable with at least a second central processing unit, the second microcontroller unit being separate from and independent of the first microcontroller unit, the compliance control module configured to control the drive system and the vacuum collection system according to the second non-transitory instructions;
    a plurality of sensors independently coupled with the main controller and the compliance control module, the sensors configured to generate sensor data outputs related to components and subsystems of the autonomous surface cleaning device, the sensors configured to separately provide the sensor data outputs to the main controller and the compliance control module;
    wherein the first non-transitory instructions control the main controller to control an operation of the autonomous surface cleaning device based on the sensor data outputs;
    wherein the second non-transitory instructions control the compliance control module to monitor the sensor data outputs and to generate a compliance interrupt to modify or cease the operation when at least one output satisfies a predetermined threshold;
    wherein the drive system includes a plurality of drive wheels, each drive wheel being individually coupled with a motor driver and capable of being driven in a forward direction and a reverse direction according to maneuvering instructions received from the main controller, the operation being based at least in part on the maneuvering instructions;
    wherein the drive system includes a plurality of drive authorities, with two of the drive authorities dedicated to each of the drive wheels such that one of the authorities is configured for controlling movement of the corresponding wheel in the forward direction and the other is configured for controlling movement of the corresponding wheel in the reverse direction;
    wherein the second non-transitory instructions include separate logic for each of the drive authorities, the logic configured for making a decision on whether to transmit the compliance interrupt to the corresponding drive authority, the compliance interrupt controlling each of the drive authorities in receipt thereof to stop driving in the corresponding one of the forward and reverse directions; and
    wherein each drive authority receiving the compliance interrupt transmits a status message to the main controller to report the compliance interrupt.

2. The autonomous surface cleaning device of claim 1 wherein the first non-transitory instructions control the main controller to generate a main interrupt to release the drive authorities from the compliance interrupt, thereby permitting the drive authorities to resume operating according to the maneuvering instructions, wherein the compliance control module does not receive the main interrupt.

3. The autonomous surface cleaning device according to claim 1 wherein the second non-transitory instructions control the compliance control module to transmit the compliance interrupt to one or more of the drive wheels, the compliance interrupt preventing the one or more of the drive wheels in receipt thereof from continuing to perform the operation according to the maneuvering instructions.

4. The autonomous surface cleaning device according to claim 3 wherein the sensors are incapable of commanding the drive wheels to move in either of the forward and reverse directions and incapable of generating the compliance interrupt.

5. The autonomous surface cleaning device according to claim 3 wherein the compliance interrupt is configured to stop one or more of the drive wheels from operating according to the maneuvering instructions.

6. The autonomous surface cleaning device according to claim 1 wherein the compliance control module transmits the compliance interrupt without being correspondingly instructed by either of one of the sensors or the main controller to transmit the compliance interrupt.

7. The autonomous surface cleaning device according to claim 1 wherein the compliance control module transmits the compliance interrupt without the compliance interrupt being directly detected by the main controller.

8. The autonomous surface cleaning device according to claim 7 wherein the main controller determines the compliance interrupt through indirect detection, the indirect detection occurring with the compliance interrupt or information associated therewith being transmitted to the main controller within the status message, the compliance control module being incapable of receiving the status message.

9. The autonomous surface cleaning device according to claim 8 wherein the compliance control module is configured to provide information to the main controller and is incapable of receiving responsive information from the main controller.

10. An autonomous surface cleaning device comprising:
    a base adapted for movement over a surface to be cleaned;

a drive system configured to move the base over the surface;

a cleaner for cleaning the surface;

a plurality of sensors configured to generate outputs related to components and subsystems of the autonomous surface cleaning device;

a main controller configured to issue maneuvering instructions for autonomously controlling the drive system to move the base over the surface;

a compliance control module configured to monitor the outputs from the plurality of sensors and, in response at least one of the outputs satisfying a predetermined threshold, to generate a compliance interrupt to control the drive system to cease operating according to the maneuvering instructions;

wherein the compliance control module is separate from the main controller and transmits the compliance interrupt directly to the drive system indirectly of the main controller;

wherein the drive system includes at least a first drive wheel and a second drive wheel, the first and second drive wheels being individually coupled with a motor driver and capable of being controllably driven in a forward direction and a reverse direction, the first drive wheel having a first forward authority for the forward direction and a first reverse authority for the reverse direction, the second drive wheel having a second forward authority for the forward direction and a second reverse authority for the reverse direction;

wherein the maneuvering instructions are configured to control at least the first forward authority to drive the first drive wheel in the forward direction;

wherein the compliance interrupt is configured to control the first forward authority to cease driving the first drive wheel in the forward direction; and wherein the first forward authority transmits a status message to the main controller to indirectly report the compliance interrupt thereto.

11. The autonomous surface cleaning device according to claim 10 wherein the compliance interrupt is configured to permit one or more of the first and second reverse authorities and the second forward authority to continue correspondingly driving the first and second drive wheels according to the maneuvering instructions.

12. The autonomous surface cleaning device according to claim 10 wherein the compliance control module includes compliance logic for generating the compliance interrupt, the compliance logic being unique from a main logic of the main controller, the main logic configured for generating the maneuvering instructions.

13. An autonomous surface cleaning device comprising:

a base adapted for movement over a surface to be cleaned;

a drive system configured to move the base over the surface;

a cleaner for cleaning the surface;

a plurality of sensors configured to generate outputs related to components and subsystems of the autonomous surface cleaning device;

a main controller configured to issue cleaning instructions for autonomously controlling the cleaner to clean the surface;

a compliance control module configured to monitor the outputs from the plurality of sensors and, in response at least one of the outputs satisfying a predetermined threshold, to transmit a compliance interrupt directly to the cleaner indirectly of the main controller, the compliance interrupt controlling the cleaner to cease operating according to the cleaning instructions;

wherein the cleaner indirectly reports the compliance interrupt to the main controller with a status message, the cleaner generating the status message in response to receipt of the compliance interrupt; and wherein the compliance control module is separate from the main controller and incapable of receiving information from the main controller.

* * * * *